Oct. 7, 1958  K. L. SANDERS, JR  2,855,560
THYRATRON CONTROLLED MAGNETIC AMPLIFIER HAVING A
REVERSIBLE-POLARITY DIRECT-CURRENT OUTPUT
Filed Nov. 22, 1952

*INVENTOR.*
KEITH L. SANDERS JR.
BY
*William R Lane*
ATTORNEY

United States Patent Office 2,855,560
Patented Oct. 7, 1958

2,855,560

THYRATRON CONTROLLED MAGNETIC AMPLIFIER HAVING A REVERSIBLE-POLARITY DIRECT-CURRENT OUTPUT

Keith L. Sanders, Jr., Paramount, Calif., assignor to North American Aviation, Inc.

Application November 22, 1952, Serial No. 321,972

11 Claims. (Cl. 321—25)

This invention relates to magnetic amplifiers, and particularly to a magnetic amplifier which produces a reversible-polarity direct-current output with a minimum time delay between the initiation of a transient in the control circuit and the realization thereof in the load circuit.

This invention contemplates a reversible-polarity direct-current output magnetic amplifier which has a small time delay and which utilizes either a thyratron or a dummy resistor in the part of the circuit adjacent to the alternating current source to prevent current flow in the load windings of the various saturable reactors during the time when the level of magnetization of the cores is being changed by current flow in the control windings.

It is therefore an object of this invention to provide an improved magnetic amplifier.

It is another object of this invention to provide a magnetic amplifier having a very small time delay.

It is another object of this invention to provide a magnetic amplifier of increased efficiency and reduced time delay.

Figure 1:
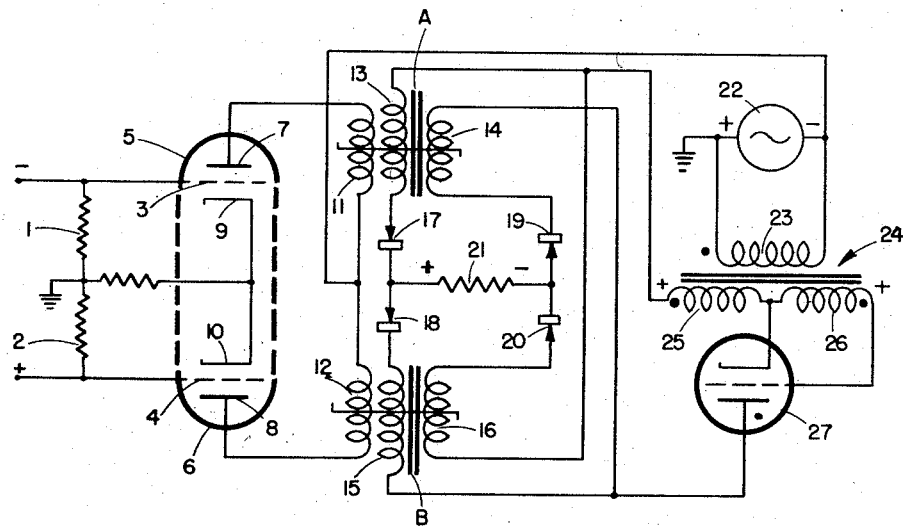
Figure 2:
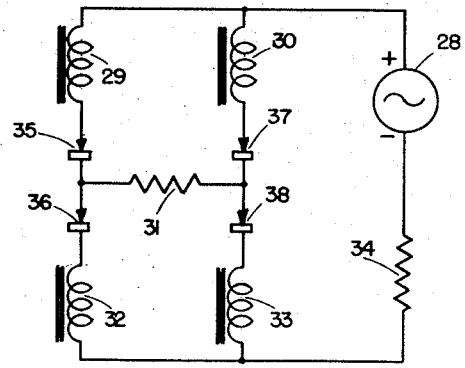

Other objects of invention will become apparent from the following description taken in connection with the accompanying drawings, in which:

Fig. 1 is a circuit diagram of the invention; and
Fig. 2 is a circuit diagram of a modified form of the invention.

Referring to Fig. 1, an input signal is supplied across resistors 1 and 2 to grids 3 and 4 of triodes 5 and 6. Current flow from plates 7 and 8 to cathodes 9 and 10 through control windings 11 and 12 is effective in magnetizing or demagnetizing (resetting) saturable reactor cores A and B, respectively. Cores A and B also carry load windings 13, 14, 15, and 16, as shown. These load windings are connected through rectifiers 17, 18, 19, and 20 to load 21 which is represented in Fig. 1 as a resistor. Alternating current is supplied from source 22 through primary winding 23 of transformer 24 which carries secondary windings 25 and 26 connected to load winding 13 and thyratron 27, as shown.

In operation, if the control signal is applied as shown in Fig. 1, current flows through control winding 12 but not through control winding 11. The load and control windings of saturable reactor cores A and B are arranged so that a load current is effective in saturating a core while current flow through the control windings is effective in resetting the core. Consequently, if current flows through control winding 12 the net result is that core B is continuously magnetized and reset on successive half cycles of the supply voltage. Core A, on the other hand, remains saturated and, hence, load windings 13 and 14 conduct with substantially zero impedance. During the half cycle of the supply voltage shown by the polarities indicated in Fig. 1, then, current flows from transformer secondary winding 25 through load winding 13, rectifier 17, load 21, rectifier 19, and load winding 14 to the plate of thyratron 27. If the grid of thyratron 27 is positive, current flows through the thyratron back to transformer secondary winding 25.

During the next succeeding half cycle, none of the load windings conduct so that the load receives a half-wave rectified direct-current output. If the polarity of the input is reversed, core A successively magnetizes and resets, while core B remains saturated with current being conducted through the load in the opposite direction. Thus, it is seen that the output of the amplifier is of reversible polarity.

During the half cycle succeeding the half cycle represented by the polarities shown in Fig. 1, saturable reactor core B is reset. This reset is accomplished by current flow through control winding 12. There is thus induced in each of the load windings of core B the full magnetizing voltage of the core. However, in order to effect the change in the level of magnetization necessary to reset these cores it is necessary that load windings 15 and 16 be prevented from conducting current in transformer fashion. Otherwise the magnetomotive force (M. M. F.) caused by this current flow will reduce the resetting M. M. F. thereby preventing the required magnetization level change. A voltage equal to the voltage developed across each load winding is available from secondary winding 25 to oppose the voltage developed in the load windings, but it will be noted from the figure that windings 15 and 16 are connected in series and that, therefore, twice the supply voltage would be required to overcome the resetting voltage induced in windings 15 and 16. Thyratron 27 must, therefore, be cut off, which operation is accomplished by driving the grid of the thyratron negative as shown by the connections of Fig. 1.

In Fig. 2 there is shown a second embodiment of the invention in which thyratron 27 has been replaced by a resistor having a resistance equal to the resistive component of the load. In Fig. 2 only the load circuit is shown, it being understood that the control circuit for the embodiment of this invention is the same as that for the embodiment of the invention shown in Fig. 1. In Fig. 2, source 28 supplies current through saturable reactor winding 29 or 30 to load 31 which in turn passes current to saturable reactor load winding 32 or 33 and thence to dummy resistor 34. Rectifiers 35, 36, 37, and 38 complete the circuit.

In operation, if windings 29 and 33 are wound upon the same core in a fashion similar to windings 13 and 14 upon core A, or windings 15 and 16 upon core B in Fig. 1; or if these windings are wound upon separate cores, but the control windings associated with these cores are connected in series to be controlled by a single triode or other type control circuit; and if a similar arrangement is adopted with respect to windings 30 and 32 it is possible to cause windings 29 and 33 to conduct during the half cycle of the supply voltage indicated in Fig. 2. Current is then conducted from source 28 through winding 29, rectifier 35, load 31, rectifier 38, winding 33, and resistor 34. During this half cycle, the cores upon which windings 30 and 32 are wound are being magnetized.

During the succeeding half cycle, current is prevented from flowing through the load by the rectifiers, but now the cores upon which windings 30 and 32 are wound are being reset by the control current. However, in order to effect the change in the level of magnetization necessary to reset these cores it is necessary that load windings 30 and 32 be prevented from conducting current in transformer fashion or else the magnetization level change will not take place. The presence of resistor 34 effectively prevents this current flow in the following manner: In the half cycle represented by the polarities shown in Fig. 2, since the cores upon which windings 29 and 33 are wound were already saturated at the beginning of the half cycle, there can be no voltage drop across these windings except for copper loss and the forward resistance of the rectifiers which, for the purposes of this analysis, may be neglected. The voltage drop across the load is then $$\frac{V}{2}$$

and the voltage drop across resistor 34 is $$\frac{V}{2}$$

where V is the voltage output of source 28.

$$\frac{V}{2}$$

is also available for saturating the cores upon which windings 30 and 32 are wound. Since the voltage wave form of source 28 is sinusoidal, or at least symmetrical, it is seen that the cores upon which windings 30 and 32 are wound are saturated by the use of a certain number of volt seconds from source 28. An exactly equivalent number of volt seconds is required on the succeeding half cycle to reset these cores. There is tendency, therefore, for there to be induced in windings 30 and 32 a voltage equal to $$\frac{V}{2}$$

On the half cycle succeeding the half cycle shown in Fig. 2, then, while the cores upon which windings 30 and 32 are wound are being reset, the induced voltages in windings 30 and 32 being connected in series are additive but total only V, the voltage available at source 28 to oppose current flow. Current flow through these windings is therefore held to zero, and the control current flowing in the control windings associated with these cores is effective to reset these cores in only one half cycle. If resistor 34 were eliminated from the circuit it may be observed that during the half cycle represented by the polarities shown in Fig. 2, a voltage equal to V would be effective in saturating the cores associated with these windings, and during the succeeding half cycle the series voltage developed by windings 30 and 32 would be equal to 2V which, opposed only by a voltage of V from source 28, would cause current flow, and the cores upon which windings 30 and 32 are wound would be only partially reset during that succeeding half cycle.

It may be observed that the presence of resistor 34 reduces the efficiency of the circuit shown in Fig. 2 to exactly half the efficiency of the circuit shown in Fig. 1, because in the circuit of Fig. 1, thyratron 27 replaces the dummy load resistor. While the circuit of Fig. 2 is thus theoretically only 50 percent efficient, because the dummy load resistor is in the power line from source 28, this resistance may, in actual practice, often be supplied by line losses if the voltage source is remote.

The amplifiers shown in Figs. 1 and 2 have a characteristic minimum time delay, since any core that must be reset may be reset during the first half cycle of the supply voltage in which the core could normally be reset. The time delay for both circuits is the same, but the efficiency of the circuit of Fig. 1 is greater than that of Fig. 2, while the circuit of Fig. 2 may be preferred in some cases because it requires no vacuum tubes.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A magnetic amplifier for furnishing reversible-polarity direct current to a two-terminal load from a source of alternating current comprising first and second saturable cores; a first series current path including a first saturable reactor load winding on said first saturable core, a rectifier, said load, a second rectifier, and a second saturable reactor load winding on said first saturable core; a second series current path including a third saturable reactor load winding on said second saturable core; a third rectifier, said load, a fourth rectifier, a fourth saturable reactor load winding on said second saturable core; control means including a control winding on each of said first and second saturable cores; means for selectively energizing the control winding of each of said reactor cores whereby the saturable cores are reset when said control windings are energized; and a resistor connected in series with said current paths to said source of alternating current, said resistor having a resistance equal to the effective resistance of said load.

2. A magnetic amplifier for furnishing reversible-polarity direct current to a two-terminal load from a source of alternating current comprising first and second saturable cores; a first series current path including a first saturable reactor load winding on said first saturable core, a rectifier, said load, a second rectifier, and a second saturable reactor load winding on said first saturable core; a second series current path including a third saturable reactor load winding on said second saturable core; a third rectifier, said load, a fourth rectifier, and a fourth saturable reactor load winding on said second saturable core; control means including a control winding on each of said first and second saturable cores; means for selectively energizing the control winding of each of said reactor cores whereby the saturable cores are reset when said control windings are energized; and switching means operable in response to said source of alternating current to permit the flow of current through said load windings only during alternate half cycles of the polarity causing said first or second saturable cores to saturate.

3. A device as recited in claim 2 in which said switching means is a thyratron grid-connected to said source of alternating current to fire only during the saturating half cycles of said saturable reactor cores.

4. A magnetic amplifier for furnishing reversible-polarity direct current to a two-terminal load from a source of alternating current comprising a first current path including a first load winding of a first saturable reactor, a rectifier, said load, a second rectifier, and a second load winding of said first saturable reactor; a second current path including a first load winding on a second saturable reactor, a third rectifier, said load, a fourth rectifier, and a second load winding on said second saturable reactor; the elements of said paths being connected to allow current flow in the direction indicated by the order of said elements; and an impedance connected in series with said current paths to said source of alternating current.

5. A device as recited in claim 4 and further comprising control windings on said saturable reactors for selectively resetting one or the other of said saturable reactors when permitted by the flow of load current through said load windings.

6. A device as recited in claim 4 in which said impedance is a resistor of resistance equal to the resistance of said load to thereby provide a magnetic amplifier of minimum time delay and fifty percent efficiency.

7. A device as recited in claim 4 in which said impedance is a gas-filled vacuum tube connected to conduct only during predetermined alternate half cycles of said alternating current source to thereby provide a magnetic amplifier of minimum time delay and one-hundred percent efficiency.

8. A magnetic amplifier for furnishing reversible-polarity direct current to a two-terminal load from a source of alternating current comprising a first current path including a first load winding of a first saturable reactor, a rectifier, said load, a second rectifier, and a second load winding of said first saturable reactor; a second current path including a first load winding on a second saturable reactor, a third rectifier, said load, a fourth rectifier, and a second load winding on said second saturable reactor; the elements of said paths being connected to allow current flow in the direction indicated by the order of said elements; control windings on said saturable reactors for selectively resetting one or the other of said saturable reactors when permitted by the flow of load current through said load windings; and a resistor of resistance equal to said load connected in series with said current paths to said source of alternating current to thereby provide a magnetic amplifier of minimum time delay and fifty percent efficiency.

9. A magnetic amplifier for furnishing reversible-polarity direct current to a two-terminal load from a source of alternating current comprising a first current path including a first load winding of a first saturable reactor, a rectifier, said load, a second rectifier, and a second load winding of said first saturable reactor; a second current path including a first load winding on a second saturable reactor, a third rectifier, said load, a fourth rectifier, and a second load winding on said second saturable reactor; the elements of said paths being connected to allow current flow in the direction indicated by the order of said elements; control windings on said saturable reactors for selectively resetting one or the other of said saturable reactors when permitted by the flow of load current through said load windings; and a gas-filled vacuum tube connected in series with said current paths to said source of alternating current to conduct only during predetermined alternate half cycles of said alternating current source to thereby provide a magnetic amplifier of minimum time delay and one-hundred percent efficiency.

10. A saturable magnetic amplifier for furnishing reversible-polarity direct current to a two-terminal load from a source of alternating current comprising two saturable reactors each having a core, a load winding, and a control winding, a first unidirectional current path for connecting said source of alternating current with a load winding of one of said reactors and said load during alternate half cycles of one polarity, a second unidirectional current path for connecting said source of alternating current with a load winding of the other of said reactors and said load during alternate half cycles of the same polarity which causes current to flow in said first unidirectional current path, said first unidirectional current path connected so as to allow current flow through said load in a direction opposite that of said second unidirectional current path, means for selectively energizing the control winding of each of said reactors, said control windings adapted to reset the cores of said reactors when said control windings are energized, and switching means operable in response to said source of alternating current to prevent the flow of current through said load windings during alternate half cycles of polarity opposite that which causes current to flow in said first and second unidirectional means.

11. A saturable magnetic amplifier for furnishing reversible-polarity direct current to a two-terminal load from a source of alternating current comprising two saturable reactors each having a core, a load winding and a control winding, a first unidirectional current path for connecting said source of alternating current with a load winding of one of said reactors and said load during alternate half cycles of one polarity, a second unidirectional current path for connecting said source of alternating current with a load winding of the other of said reactors and said load during alternate half cycles of the same polarity which causes current to flow in said first unidirectional current path, said first unidirectional current path connected so as to allow current flow through said load in a direction opposite that of said second unidirectional current path, means for selectively energizing the control windings of each of said reactors, said control windings adapted to reset the cores of said reactors when said control windings are energized, and a resistor connected in series with said source of alternating current and said first and second unidirectional current paths, said resistor having a resistance equal to the effective resistance of said load.

References Cited in the file of this patent

UNITED STATES PATENTS

| | | |
|---|---|---|
| 2,453,624 | Glass | Nov. 9, 1948 |
| 2,458,937 | Glass | Jan. 11, 1949 |
| 2,493,130 | Glass | Jan. 3, 1950 |
| 2,571,708 | Graves | Oct. 16, 1951 |
| 2,634,395 | Glass | Apr. 7, 1953 |
| 2,723,373 | Steinitz | Nov. 8, 1955 |
| 2,745,055 | Woerdmann | May 8, 1956 |
| 2,745,908 | Cohen et al. | May 15, 1956 |